United States Patent Office 3,297,614
Patented Jan. 10, 1967

3,297,614
STYRENE-ACRYLATE-UNSATURATED ACID CO-
POLYMER PIGMENTED PAPER COATINGS
Robert J. Pueschner, St. Louis, and Harold A. Walters,
Beaverton, Mich., assignors to The Dow Chemical Company, Midland, Mich., a corporation of Delaware
No Drawing. Filed Nov. 2, 1962, Ser. No. 235,127
12 Claims. (Cl. 260—29.6)

This invention relates to an improved aqueous coating composition and in particular relates to pigmented coating compositions and to paper coated therewith.

In these specifications and claims, the term "paper" is intended to means sheets or webs of fibrous materials which consist mainly of the fibers of cellulose such as are obtained from wood pulp, cotton, bark and straw and which range from very thin and very flexible sheets or webs to relatively thick, rigid board including substances known variously as paperboard, pasteboard, cardboard, and the like.

A considerable art has developed in coating paper with substances to improve the printability, appearance, water resistance and other properties of the product. Pigments, such as clay, impart valuable properties to the paper but do not have sufficient adhesiveness to adhere to the paper. Therefore, various materials have been used as adhesives or binders to cause the pigmentary matter to remain on the paper in order to carry out its beneficial function. The mixture of pigment and adhesive advantageously is applied to a paper substrate from aqueous media. The use of synthetic, film-forming latexes as pigment-binding adhesives has grown considerably in the period of about the last ten years. Such growth has resulted from the recognition of the valuable properties of the latexes for this use, such as their pigment-binding power, their contribution to other desirable properties of the composition, and the fact that they may be mixed readily with mineral matter and with other adhesives, if desired. It would be advantageous, however, to obtain certain further improvements so that the coated paper may have an even wider range of utility as well as to obtain better handling qualities of the aqueous dispersion comprising the adhesive and the pigments.

Specifically, one of the problems of handling such aqueous dispersions is the build-up of an uneven film or deposit of solids from the dispersion onto portions of the metering roll or other equipment being used. Such a bulid-up (often called in the art, "plate out") interferes with obtaining a smooth, uniform coating on the paper and may cause the web to stick to the rolls or other parts of the equipment.

A method of determining the quality of an adhesive which is effective in forestalling such deficiencies is the "roll stability" tests as described infra.

Also the properties of the binder in adhering to itself and to the mineral matter and in causing the coating composition to adhere to the paper are measured by tests known as wet pick and dry pick (also described infra). Favorable results in these pick tests are positively related to satisfactory printing behavior of the coated paper.

It is an object of this invention to provide an improved composition for coating paper. It is a further object to provide for use in coating paper an aqueous composition which has improved roll stability. It is a still further object to provide a composition which, when applied to paper, will provide a coating having improved wet and dry pick. It is a special object of this invention to provide a composition which has the combined advantages of improved roll stability and of imparting improved wet and dry pick to the coated product. These and other objects will be apparent from the following description of our invention.

We have discovered, and this discovery is the subject of this invention, that an improved paper coating composition is obtained by incorporating therein as adhesive an aqueous colloidal dispersion comprising a copolymer of (a) from about 5 to about 48 percent by weight of an alkenyl aromatic compound or a halogenated alkenyl aromatic compound (b) from about 50 to about 93 percent by weight of an alkyl ester of acrylic acid or of methacrylic acid in which the alkyl moiety has from 6 to 12 carbon atoms and (c) from about 2 to about 5 percent of at least one α,β-ethylenically unsaturated carboxylic acid having from 3 to 5 carbon atoms.

The latexes for use in the practice of this invention are obtained by the emulsion polymerization of at least one monomer from each of three classes. Class A consists of the alkenyl aromatic monomers having the formula

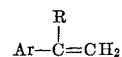

in which R is selected from the group consisting of H— and —CH₃ and Ar is selected from the group consisting of aromatic hydrocarbon radicals and halogenated aromatic hydrocarbon radicals having at least one halogen attached to the aromatic nucleus, the said halogen having an atomic number from 17 to 35. The Class A monomers are represented by styrene and the substituted styrenes having at least one substituent selected from the alkyl groups having from 1 to 4 carbon atoms and the halogens consisting of chlorine and bromine. Specific exemplary Class A monomers are styrene, alpha-methylstyrene, ar-ethylstyrene, vinyltoluene, α,ar-dimethylstyrene, ar,ar-dimethylstyrene, ar-t-butylstyrene, o-chlorostyrene, m-chlorostyrene, p-chlorostyrene, p-bromostyrene, 2,4 - dichlorostyrene, 2,5 - dichlorostyrene, vinylnapthalene and the like. Of the Class A monomers, styrene is preferred.

The Class B monomers consist of the alkyl esters of acrylic acid and of methacrylic acid in which the alkyl moiety has from 6 to 12 carbon atoms. Representative examples of the Class B monomers are n-hexyl acrylate, ethylbutyl acrylate, 2-ethylhexyl acrylate, n-octyl acrylate, n-decyl acrylate, dodecyl acrylate, n-hexyl methacrylate, ethylbutyl methacrylate, 2-ethylhexyl methacrylate, n-octyl methacrylate, n-decyl methacrylate, dodecyl methacrylate, and the like. Of the Class B monomers, 2-ethylhexyl acrylate is preferred.

The Class C monomers consist of the α,β-ethylenically unsaturated carboxylic acids having from 3 to 5 carbon atoms. Representative examples of the Class C monomers are acrylic acid, methacrylic acid, fumaric acid, and itaconic acid. Mixtures of these acids may be used, if desired.

In order to carry out the polymerization, the emulsifier required in the aqueous starting composition comprising the polymerizable monomers is selected from anionic and non-ionic emulsifiers examples of which are known to the art, such as the alkyl aryl sulfonates, the alkali metal alkyl sulfates, the fatty acid soaps, the polyether alcohols and the like. Specific examples of these well known emulsifiers, for the purpose of illustration and not for limitation, are sodium lauryl sulfate, the dihexyl ester of sodium sulfosuccinic acid, and isooctyl phenyl polyethoxy ethanol. It is preferred that at least a predominant proportion of the emulsifiers should be of the anionic type. Such emulsifiers usually are used in amounts ranging from about 0.02 percent to about 2.5 percent based on the total weight of the monomers.

The aqueous starting composition comprising the polymerizable material may contain free-radical polymerization catalysts of kinds already known to promote emulsion polymerization. Among such catalysts are water-soluble oxidizing agents such as hydrogen peroxide, ammonium persulfate, and potassium persulfate and catalysts which, like the redox catalysts, are activated in the water phase, e.g., by a water-soluble reducing agent. Similarly free-radical catalysis is provided by other means such as ultraviolet radiation and gamma irradiation. Optionally, the aqueous starting composition may include accelerators, chain regulators, chelating agents, and acids, bases or salts to provide a desired pH value (usually below about 7) or possibly a buffered system.

The aqueous starting composition usually is such as provides from about 5 to about 55 percent by weight of the polymerizable constituents and correspondingly from about 95 to about 45 percent by weight of the aqueous medium, although proportions outside these ranges can be used.

Such an aqueous starting composition is subjected to conditions conducive to polymerization. As is known, the temperature required for such polymerizations varies with the catalyst system and may range from about 0° C. to about 100° C. Usually, however, temperatures from about 40° C. to about 100° C. are used.

Latexes in accordance with this invention can be prepared by polymerizing the monomer compositions described herein using procedural steps for making latexes discussed in the article by D. A. Taber and R. C. Stein, "Effect of Latex Variables on Properties of Coating Colors and Coated Papers," Tappi, Vol. 40, No. 2, pages 107–117, February 1957. Often, however, it is preferred to add the monomers, particularly the acidic monomers, continuously to the remainder of the ingredients of the polymerization system.

While the polymerization of the monomers to form the latex usually is carried out at pH below about 7, after polymerization appropriate agents are added to adjust the pH to a value of about 6 to 10. The pH adjustment may be the addition of ammonium hydroxide; the metal hydroxides, such as the hydroxides of sodium, potassium and lithium; the water-soluble amines, such as methylamine; or the hydroxyamines, such as ethanolamine, diethanolamine, triethanolamine; and the like. After such pH adjustment the carboxyl groups on the copolymer comprising the latex will be predominantly in the salt form.

The pigments which are used are finely divided materials which are predominantly mineral in character but may be partly organic. Additionally, for the practice of this invention, a predominant portion, i.e. at least 50 percent of such finely divided pigmentary materials consists of clays, especially of the kaolin type. However, calcium carbonate and titanium dioxide are commonly employed and other materials such as talc, blanc fixe, ochre, carbon black, aluminum powder or platelets and similar pigmentary matter may be used in minor proportions. The pigment, or pigment mixture, preferably is dispersed in water and the pH of the resulting dispersion normally is adjusted to a value of from about 6 to about 9 before mixing with the said latex to form the aqueous mineral coating composition. Tetrasodium pyrophosphate often is used as a dispersing aid in forming the pigment dispersion and in that case no additional pH adjustment usually is required. On the other hand, if no other additives are present while forming the aqueous dispersion or if agents which are acidic or which require an alkaline pH for effectiveness are used, such as sodium hexametaphosphate, a pH adjustment usually is made with alkalizing agents such as sodium hydroxide, potassium hydroxide, ammonium hydroxide, and the like.

The term "pigment" is used herein in the sense of definition (1) in Hackh's Chemical Dictionary, McGraw-Hill Publishing Co., New York, 3rd Ed., 1944, page 659.

The term "coating color" often is applied in the art to the aqueous dispersion comprising the adhesive and the pigment. The adhesive and the pigment dispersion are mixed in such proportions that for each 100 parts by weight of dry pigment from about 5 to about 30 parts by weight, dry basis, of the adhesive are present in the aqueous mixture. The latex disclosed by this invention may be the sole pigment-binding adhesive employed in the coating color for use in the practice of this invention or other adhesives known to the art, e.g. other latexes, casein, soybean proteins and starches may be used in conjunction with the latex if desired. Most advantageously from 20 percent to 100 percent by weight of the adhesive in a coating color of this invention is the latex described herein, the percentages being based on a dry solids basis. However, a lower proportion of latex may be used, even as low as about 5 percent of the total adhesive with some advantageous results. Thus the coating color preferably comprises from about 1 to about 30 parts by weight of latex solids per 100 parts of pigment, dry basis, in the aqueous mixture.

The total solids content of the coating color does not differ substantially from that in prior art processes, depends largely on the equipment being used and usually ranges from about 8 percent to about 65 percent.

The aqueous mineral coating composition (coating color) is applied to the paper by conventional means such as letterpress print roll coater, offset roll coater, size press, air knife, and blade coater.

After application of the coating it is dried by any convenient method but such drying often is accomplished by causing a current of air at a velocity of up to about 10,000 feet per minute to impinge on the surface of the coated material. The temperature of the air may vary up to 600° F. but the duration of contact of the heated air with the coating is such that the coating is not heated above about 250° F.

The "roll stability" test is carried out as follows: Two rolls made of different materials having different hardness, e.g., one rubber roll and one steel roll, are held together by pressure thus causing a compression, or nip, between the rolls. The aqueous binder is caused to flow between the rolls as they are counter rotating and this action results in shearing forces on the aqueous dispersion. A dispersion which after ten minutes has not plated out noticeably on the rolls will be stable for a considerably longer time. If no plating out can be seen after at least 10 minutes, the material is considered to have passed the test.

The dry pick and the wet pick are recorded according to the results obtained with the standard IGT pick test using the standard equipment and procedure well known in the art.

For purposes of specifically illustrating, without thereby intending to limit the invention, the following exemplifications are provided wherein, unless otherwise indicated, all parts and percentages are by weight:

*Example No. 1*

A clay dispersion was prepared by mixing thoroughly 100 parts of kaolin (#1 coating grade clay), 0.3 part of tetrasodium pyrophosphate and 42.7 parts of distilled water. To this clay dispersion was added sufficient latex, as described below, to provide 15 parts of copolymer solids and sufficient distilled water to provide a dispersion containing 60 percent total solids; the said latex having been prepared from a monomer solution consisting of 39.1 parts of styrene, 56.9 parts of 2-ethylhexyl acrylate and 4.0 parts of acrylic acid in a process wherein an aqueous composition consisting of 100 parts of distilled water, 0.6 part of potassium persulfate, 0.8 part of sodium sulfate and 1.7 parts of an aqueous paste comprising about 29 percent of sodium lauryl sulfate was agitated and heated to a temperature of 80° C., then the monomer solution was added in a continuous manner with about the first 20 percent being added at a fast rate and the remaining quantity, about 80 percent, being added in a slow, substantially uniform rate such as required from 2 to 3 hours to complete the addition while agitation was continued and the temperature was maintained at about 80° C. during the monomer addition and for from 4 to 5 above in the example of the invention. The pick test results are summarized in Table I.

TABLE I

| | Latex Used to Prepare the Coating Color | | | | | Test Results | |
|---|---|---|---|---|---|---|---|
| | Styrene Parts | 2-EHA Parts [1] | BA Parts [2] | AA Parts [3] | Ink Tack No.[4] | Dry Pick, ft./min. | Wet Pick, ft./min. |
| Latex A | 39.1 | 56.9 | | 4.0 | 5 | 600 | 80 |
| Latex B* | 39.1 | | 56.9 | 4.0 | 5 | 460 | 80 |

[1] 2-ethylhexyl acrylate.
[2] Butyl acrylate.
[3] Acrylic acid.
[4] I.P.I. rated.
*A latex outside the scope of this invention.

hours thereafter, thus giving a total available polymerization time of 7 hours. The coating color, thus prepared, was filtered through a 115-mesh screen, then coated onto 51-pound, bleached sulfite paper by use of a wire-wound rod to give a coating weight of about 16 pounds, dry basis, per ream (25" x 38"—500). The coated papers were then dried at room temperature for at least 30 minutes after which they were super-calendered through 6 nips at 1200 lbs. per lineal inch pressure and at room temperature. The calendered, coated paper was aged overnight in a constant temperature room at 75° F. and 50 percent relative humidity, then tested on the IGT printability tester for wet pick and dry pick according to standard well-known procedures using a 35-kilogram printing pressure, "B" sector velocity, and No. 5 tack graded ink. The results are shown in Table I.

The latex (hereinafter referred to as Latex A) used to prepare the above coating showed no plating out in the 10-minute roll stability test when the pH was adjusted to 8 or higher.

Substantially the same results were obtained when for the acrylic acid there was substituted methacrylic acid, fumaric acid, itaconic acid, and mixtures thereof. An especially valuable mixture is acrylic acid and fumaric acid. Similarly, other alkenyl aromatic compounds, such as α-methylstyrene, vinyltoluene, ar,ar-dimethylstyrene, o-chlorostyrene, p-bromostyrene, and 2,4-dichlorostyrene, may be substituted for the styrene; and other alkyl esters of acrylic acid and alkyl esters of methacrylic acid, such as n-hexyl acrylate, ethylbutyl acrylate, ethylbutyl methacrylate, 2-ethylhexyl methacrylate, n-decyl acrylate and dodecyl methacrylate, may be substituted for the 2-ethylhexyl acrylate of the above example, with substantially the same results.

For purposes of comparison with the above example of the advantageous product obtained in the practice of this invention, a latex (hereinafter referred to as Latex B) was prepared by the same procedure and using the same materials except that the same weight of butyl acrylate, i.e., a monomer outside the limits of this invention, was substituted for the 2-ethylhexyl acrylate of the above example. Latex B failed the roll stability test within one minute. A coating color was made from Latex B and a coated paper was prepared in the same manner as outlined

*Example 2*

Latexes were prepared in the procedure described in Example 1 except with a different monomer composition. Clay-coating compositions then were made from these latexes by the method described in Example 1 using different binder levels, i.e., 12, 15 and 18 parts of latex copolymer solids per 100 parts of clay, in a dispersion which comprised 60 percent total solids. The clay coatings from each of the latexes at each binder level were applied to bleached kraft paperboard in an amount sufficient to give 4–5 pounds of the dried coating per 1000 square feet. The coated paperboard sheets were dried for one minute at 220° F., then they were conditioned overnight in a constant temperature room at 75° F. and 50 percent relative humidity. The coated paperboard sheets were then calendered through 2 nips at a pressure of 800 pounds per lineal inch. The wet pick and the dry pick measurements were taken on the IGT printability tester using a printing pressure of 50 kilograms, "A" sector velocity. The results and the tack of the ink used are shown in Table II. It should be noted that latex C is a latex of this invention whereas the composition of latex D is outside the limits of the invention.

TABLE II

| | Styrene Parts | 2-EHA Parts [1] | AA Parts [2] | Binder Parts [3] | Ink Tack No.[4] | Dry Pick, ft./min. | Wet Pick, ft./min. |
|---|---|---|---|---|---|---|---|
| Latex C | 45 | 52 | 3.0 | 12 | 4 | 105 | 40 |
| | 45 | 52 | 3.0 | 15 | 4 | 180 | 60 |
| | 45 | 52 | 3.0 | 18 | 6 | 95 | 80 |
| Latex D | 60 | 37 | 3.0 | 12 | 4 | 15 | 10 |
| | 60 | 37 | 3.0 | 15 | 4 | 80 | 15 |
| | 60 | 37 | 3.0 | 18 | 6 | 50 | 30 |

NOTES:
[1] 2-EHA=2-ethylhexyl acrylate.
[2] AA=acrylic acid.
[3] Binder calculated as parts of copolymer solids per 100 parts pigment solids in the pigmented coating composition.
[4] I.P.I. rated.

What is claimed is:
1. A pigmentary composition for coating paper comprising an adhesive and a finely divided pigment in an aqueous medium, the pigment having at least 50 percent by weight of clay therein, there being for 100 parts by weight of the pigment from about 5 to about 30 parts by weight of pigment-binding adhesive of which from about 1 to about 30 parts, dry basis, are the latex copolymer of (a) from about 5 to about 48 percent by weight of an alkenyl aromatic monomer having the formula

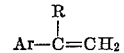

in which R is selected from the group consisting of H— and —CH$_3$ and Ar is selected from the group consisting of aromatic hydrocarbon radicals and halogenated aromatic hydrocarbon radicals having at least one halogen attached to the aromatic nucleus, the said halogen having an atomic number from 17 to 35, (b) from about 50 to about 93 percent by weight of at least one ester selected from the class consisting of the alkyl esters of acrylic acid and the alkyl esters of methacrylic acid in which the alkyl moiety of the ester has from 6 to 12 carbon atoms and (c) from about 2 to about 5 percent of at least one α,β-ethylenically unsaturated carboxylic acid having from 3 to 5 atoms.

2. The pigmentary composition of claim 1 in which the alkenyl aromatic monomer is styrene.

3. The pigmentary composition of claim 1 in which the ester is 2-ethylhexyl acrylate.

4. The pigmentary composition of claim 1 in which the acid is acrylic acid.

5. The pigmentary composition of claim 1 in which the acid is methacrylic acid.

6. The pigmentary composition of claim 1 in which the acid is a mixture of acrylic acid and fumaric acid.

7. A coated paper product comprising a paper substrate having adherent thereto a pigmented coating comprising an adhesive and a finely divided pigment, the pigment having at least 50 percent by weight of clay therein, there being for 100 parts by weight of the pigment from about 5 to about 30 parts by weight of pigment-binding adhesive of which from about 1 to about 30 parts are a copolymer of (a) from about 5 to about 48 percent by weight of an alkenyl aromatic monomer having the formula

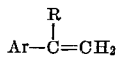

in which R is selected from the group consisting of H— and —CH₃ and Ar is selected from the group consisting of aromatic hydrocarbon radicals and halogenated aromatic hydrocarbon radicals having at least one halogen attached to the aromatic nucleus, the said halogen having an atomic number from 17 to 35, (b) from about 50 to about 93 percent by weight of at least one ester selected from the class consisting of the alkyl esters of acrylic acid and the alkyl esters of methacrylic acid in which the alkyl moiety of the ester has from 6 to 12 carbon atoms and (c) from about 2 to about 5 percent of at least one α,β-ethylenically unsaturated carboxylic acid having from 3 to 5 carbon atoms.

8. The coated paper product of claim 7 in which the alkenyl aromatic monomer is styrene.

9. The coated paper product of claim 7 in which the ester is 2-ethylhexyl acrylate.

10. The coated paper product of claim 7 in which the acid is acrylic acid.

11. The coated paper product of claim 7 in which the acid is methacrylic acid.

12. The coated paper product of claim 7 in which the acid is a mixture of acrylic acid and fumaric acid.

References Cited by the Examiner

UNITED STATES PATENTS 2,726,230  12/1955  Carlson _____ 260—86.1
2,790,735  4/1957  McLaughlin et al. ____ 260—86.1

MURRAY TILLMAN, *Primary Examiner.*

J. ZIEGLER, *Assistant Examiner.*